(12) United States Patent
Harrison et al.

(10) Patent No.: US 7,992,522 B2
(45) Date of Patent: Aug. 9, 2011

(54) OFFSHORE AQUACULTURE SYSTEM

(75) Inventors: Jeffrey Harrison, Dawson Settlement (CA); Phillip Dobson, Dawson Settlement (CA); David Hoar, Fredericton (CA)

(73) Assignee: Aquaculture Engineering Group Ltd., Dawson Settlement, New Brunswick (CA)

( * ) Notice: Subject to any disclaimer, the term of this patent is extended or adjusted under 35 U.S.C. 154(b) by 0 days.

(21) Appl. No.: 12/783,480

(22) Filed: May 19, 2010

(65) Prior Publication Data
US 2010/0224135 A1   Sep. 9, 2010

Related U.S. Application Data

(63) Continuation of application No. 11/569,945, filed on Dec. 1, 2006, now Pat. No. 7,743,733.

(51) Int. Cl.
*A01K 61/00* (2006.01)

(52) U.S. Cl. .......................... 119/210; 119/223

(58) Field of Classification Search ............. 119/223, 119/207, 208, 210, 221, 224, 225, 238, 239, 119/240, 212, 230, 51.04, 51.01, 51.11, 52.1, 119/53, 57.1, 57.92; 43/102, 103
See application file for complete search history.

(56) References Cited

U.S. PATENT DOCUMENTS

| | | | |
|---|---|---|---|
| 3,741,159 A | 6/1973 | Halaunbrenner |
| 3,913,515 A | 10/1975 | Hernsjo et al. |
| 4,195,872 A | 4/1980 | Skaalen et al. |
| 4,257,350 A | 3/1981 | Streichenberger |
| 4,312,296 A | 1/1982 | Stelleman et al. |
| 4,716,854 A | 1/1988 | Bourdon |
| 4,744,331 A | 5/1988 | Whiffin |
| 4,751,892 A | 6/1988 | Sechel et al. |
| 4,957,064 A | 9/1990 | Koma |
| 5,172,649 A | 12/1992 | Bourgeois |
| 5,359,962 A | 11/1994 | Loverich |
| 5,412,903 A | 5/1995 | Zemach et al. |
| 5,438,958 A | 8/1995 | Ericsson et al. |
| 5,762,024 A | 6/1998 | Meilahn |
| 5,845,602 A | 12/1998 | Kaarstad et al. |
| 5,967,086 A | 10/1999 | Knott, Sr. |
| 6,044,798 A | 4/2000 | Foster et al. |
| 6,085,681 A | 7/2000 | Morton |
| 6,481,378 B1 | 11/2002 | Zemach |
| 6,488,554 B2 | 12/2002 | Walker |

(Continued)

FOREIGN PATENT DOCUMENTS

JP  402104229 A  *  4/1990

(Continued)

*Primary Examiner* — T. Nguyen
(74) *Attorney, Agent, or Firm* — Carter, DeLuca, Farrell & Schmidt, LLP

(57) ABSTRACT

The present invention provides for an off-shore unitary fish farming apparatus, including: a plurality of floatable fish containers aligned sequentially having attachment means for flexibly connecting the containers to maintain the containers in a predetermined relationship to one another, a dampening means attached to at least one or the containers to reduce current and wave and also deflect any floating debris away from the containers, a fish feed tank for holding, mixing and distribution of fish feed slurry to each of the plurality of fish containers, the fish tank having a securing means for attaching the dampening means to the tank; a feed dispenser for radially dispensing fish feed in the container directly beneath the water surface, anchor means to anchor the apparatus to an aquatic floor, the anchor means allowing radial movement or the tank around an anchor position and a crane mounted on the fish feed tank.

15 Claims, 11 Drawing Sheets

| U.S. PATENT DOCUMENTS | | | | FOREIGN PATENT DOCUMENTS | | |
|---|---|---|---|---|---|---|
| 6,520,115 B2 | 2/2003 | Boyd | | JP | 407274767 A * | 10/1995 |
| 6,892,672 B2 | 5/2005 | Klein | | WO | WO 00/10381 | 3/2000 |
| 7,650,856 B2 | 1/2010 | Quinta et al. | | WO | WO 02/100167 | 12/2002 |
| 2009/0288612 A1 | 11/2009 | Himmelstrup | | * cited by examiner | | |

OFFSHORE AQUACULTURE SYSTEM

CROSS REFERENCE TO RELATED APPLICATIONS

The present application is a Continuation of and claims the benefit of and priority to U.S. Patent Application Publication No. 2008/0035070 filed on Dec. 1, 2006, which claims the benefit of and priority to International Application Serial No. PCT/CA05/00822 filed on May 31, 2005, which claims the benefit of and priority to Canadian Application No. 2,469,601 filed on Jun. 2, 2004, the entire contents of each of the above-noted applications being incorporated herein by reference.

TECHNICAL FIELD

This invention relates to an aquaculture system; more particularly, one aspect of this invention relates to a novel system for aquaculture, particularly useful in environments where the aquaculture system is exposed to the elements (such as in an open ocean environment).

BACKGROUND OF RELATED ART

Fish aquaculture is well known and forms an established industry in many different countries. Known systems generally rely on the use of cages for raising fish, in which the feeding of the fish is controlled using various types of known feeding devices which can either be automated or manually operated.

Generally speaking, fish "farms" are located in relatively quiet harbour conditions where the weather and ocean environments are not severe as in an open ocean location. The use of such aquaculture systems under relatively calm conditions (i.e. free from wind, current, wave action, etc.) is desirable in order to minimize potential damage to equipment and to provide for controlled feeding.

With the growing aquaculture industry, many of the relatively good locations (such as quiet harbors) are reaching the point of saturation in terms of the capability of such harbors handling a given number of aquaculture systems; in other cases, the harbors under certain conditions are becoming polluted by the effluent from the aquaculture farming, and in still further situations, the increasing number of aquaculture systems is creating a problem for the use of harbors for ship, boat or similar traffic in terms of potential collisions between such traffic and anchored fish cages.

It has also been found in recent studies that placing aquaculture cages in water there is an active movement of the water can be desirable in terms of raising fish. Not only does the flow of water aid in the dispersal of effluent, but it appears to have beneficial effects on the raising of fish.

With modern technology, fish farms using cages often have very large fish populations in such cages—typically 50,000 to more than 100,000 fish can be raised under controlled conditions in a single cage. The amount of food required for such a large fish population poses another problem for the aquaculture industry, since feed supply systems must be continuously refilled or ready access to individual cages using manual feeding systems has to be provided for.

It would be desirable to develop and aquaculture system which would not be restricted to areas such as harbors but rather, could be located in the open ocean under controlled conditions which would permit raising of fish in a manner similar to that employed in protected areas such as harbors. One of the problems that would be created using an open ocean environment for the fish cages is the fact that ocean currents could cause severe problems for a successful operation; it has been found that when fish are exposed to strong flowing current conditions, the fish population can die. While limited amounts of current are desirable, excessive current is undesirable. Moreover, any ocean aquaculture system would have to be structurally designed so as to permit several fish cages to be contained within a defined area, yet permitting the plurality of cages to adapt to different current conditions when currents change. This would require a freely movable System anchored generally at a fixed point, which system could be rotatable or movable about such a fixed point.

Moreover, any ocean aquaculture system would have to be designed in such a manner that wave conditions, as well as wind conditions, would have a minimal effect on the aquaculture system, particularly for feeding or food distribution amongst several fish cages. Under quiet harbour conditions, exposure of the upper portions of fish cages would not be a detrimental factor. But, under open ocean, conditions, waves or wind can cause damage to such systems.

When considering ocean aquaculture systems, other weather conditions such as freezing rain, snow, and the like must also be take into consideration, particularly when employing an automated feeding system. Under certain conditions, the buildup of ice on an ocean system, particularly on a feed distribution system, could be disastrous in terms of maintaining fish under healthy conditions.

SUMMARY

A storage unit of the present disclosure includes a self-contained centralized fish-feed storage and distribution tank suitable for use in open water, said fish feed, storage and distribution tank including: a feed storage bin adapted to hold a supply of fish food; a mounting means for mounting said feed storage bin; a metering means for metering a supply of fish feed from said feed storage bin to a mixing chamber; a mixing chamber for receiving fish feed metered by said metering means, said mixing chamber being connected to a source of water wherein a feed slurry is formed in said mixing chamber; and a pump means operatively associated with said mixing chamber to force the slurry of fish food from said mixing chamber with pressurized water to a plurality of cages.

A containment system for feeding fish in an environmentally exposed aquatic site which includes the storage unit of the present disclosure is also provided.

BRIEF DESCRIPTION OF THE DRAWINGS

Having thus generally described the invention, reference will now be made to the accompanying drawings illustrating preferred embodiments, and in which.

DETAILED DESCRIPTION

Figure 1:
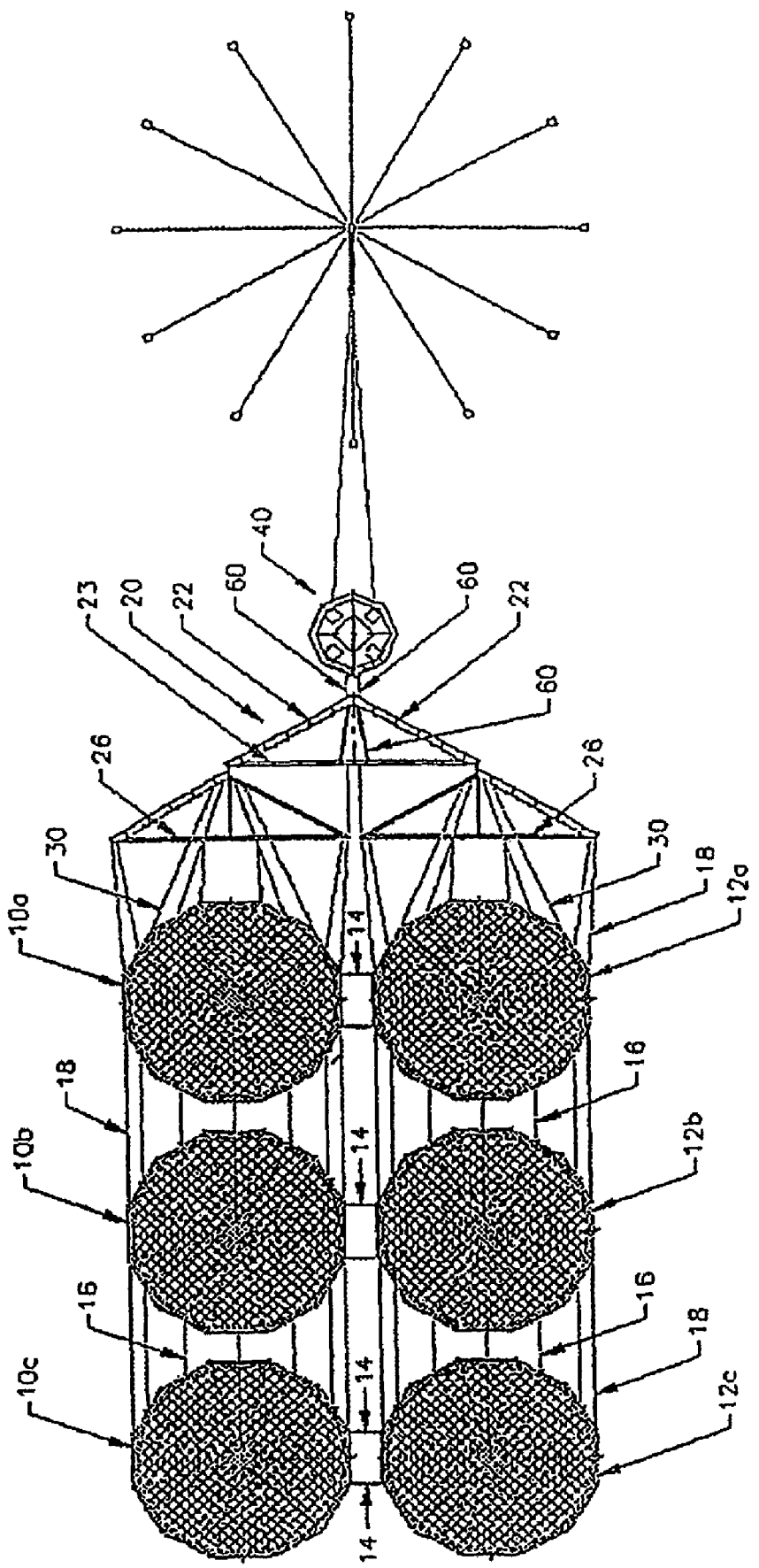
FIG. 1 is a top plan view of an over all system utilizing embodiments of the invention as disclosed herein.
Figure 2:
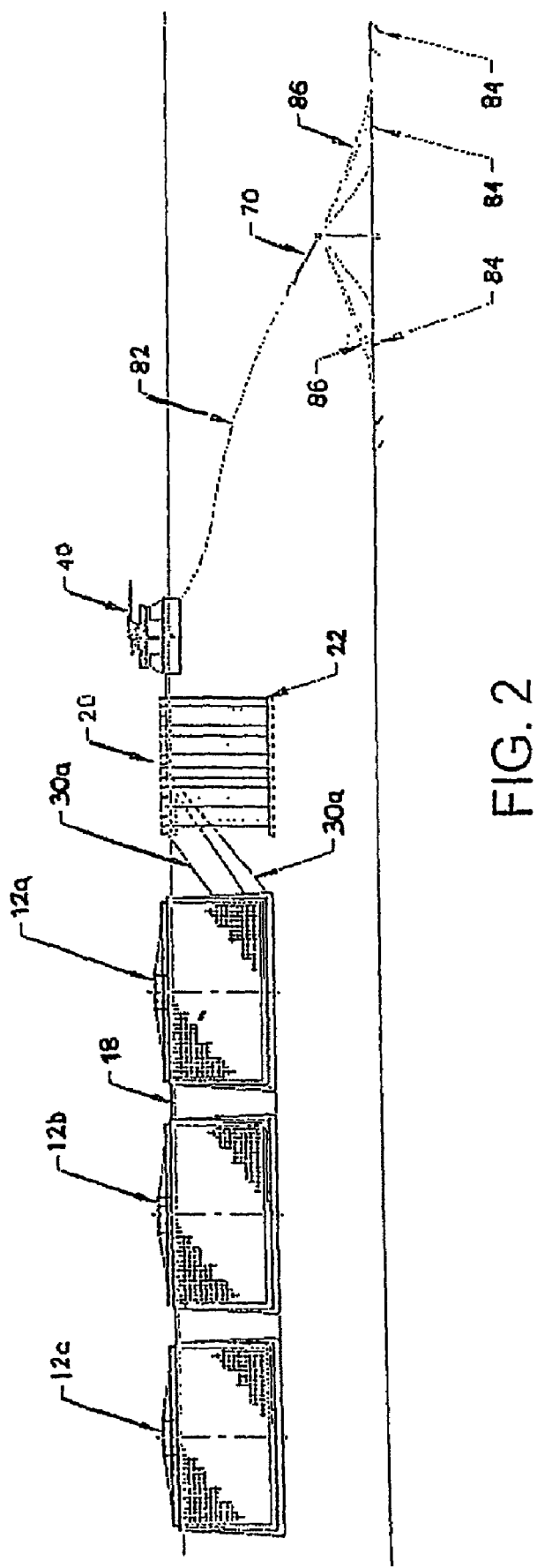
FIG. 2 is a side elevational view of the system shown in FIG. 1.

Referring initially to FIGS. 1 and 2, the overall system of one embodiment of the present invention as illustrated for use in fish aqua culture in an ocean environment where the system would be exposed to typical ocean conditions involving current flow, wind, etc. In the system shown, there are two rows of spaced apart fish cages indicated generally by reference numerals 10A, 10B and 10C in a first row and 12a, 12b and 12c in a second parallel row. Each fish cage 10 or 12 can be of conventional fish netting structure for the majority of the cage make-up; as such, the cages may, for example, be 10 to 100 meters in diameter and each is typically designed to hold a fish population of 10,000 to 800,000 fish.

The cage structure is generally of an open mesh configuration; the cages will be designed to have a closed bottom or otherwise be permanently fixed to the sea bed. In the embodiment shown in FIG. 2, the cages have a depth less than the depth of the water and generally float on the surface of the water with the balance of the cage being suspended beneath the water surface. To this end, each cage may be provided with suitable floatation means either due to the nature of the upper cage structure or by the use of appropriate air cylinders or the like. Typically, the top of the cage is desirably at or slightly above the top of the water surface, at least on the periphery of the cage.

In FIG. 2, the cages are of a type which are of a "closed" structure meaning that the cage has a bottom mesh structure to close off its lower end.

Referring to FIG. 1, as will be seen, and in accordance with the present invention, each of the rows of cages are mounted in an arrangement such that the cages are spaced from each other but as an overall unit, function to act as a single unit. To this end, each of the cages is provided with means for laterally and horizontally spacing the cages one from another; typically, semi-rigid or rigid connecting means 14 can be employed—e.g. bars or conduits which are movably connected at their respective ends to opposed cages.

Lengthwise, to this end, a plurality of similar spacers 16 pivotally or movably connect each of the cages 10 and 12 in a row. To maintain the series of cages 10 and 12 in their respective rows, confinement cables or bars 18 can be employed extending along the outside of each of the rows and connecting one cage to another. Such bars or cables 18 are movably connected to each cage in sequence, to permit relative movement of one cage to another, while maintaining lengthwise alignment.

In accordance with the present invention, there is also provided a deflector means indicated generally by reference numeral 20, which is adapted to be at the "front" of the assembly of fish cages. This deflector is intended to have a primary function of deflecting any ocean currents and also any debris or refuse away from the fish cages and is composed of a pair of arms 22 mounted in a "v" shaped configuration in a generally rigid manner. One or more suitable braces 23 may be provided to join the arms 22 forming a generally rigid deflector assembly 20.

Arms 22 preferably extend outwardly of the outer lengthwise perimeter of the series of cages 10 and 12. Deflector 22 preferably has a depth at least equal to the depths of the cages 10 and 12 (see FIG. 2) and may be composed of a mesh-type material (e.g. metallic mesh) which permits a certain amount of water flow through the mesh to enable fresh ocean water to pass through the cages 10 and 12; the mesh at the same time will function to deflect much of the current and debris around the cages to avoid damage to the fish within the cage.

Desirably, the deflector is anchored or connected to the previously described cage system and this can be achieved by use of appropriate connecting members or arms 26 extending transversely across the front of the cages between longitudinal supports 18 together with a plurality of connecting means 30 anchoring the deflector 22 to each of the first fish cage units 10a and 10b. In addition, a plurality of connecting means 30a may be connected between the lead cage 12a (and 10a) and the deflector 20 extending downwardly from the deflector 20 to spaced-apart points on the first cage (see FIG. 2).

Reference will now be made to feed storage and distribution tank indicated generally by reference numeral 40 (see FIGS. 1 and 2) and shown in greater detail in FIGS. 3 to 5.

Generally speaking, the feed storage system is design to hold a relatively large supply of feed to be dispensed to each of the fish cages and is positioned normally in front of the current deflector 20 (as shown in FIG. 1). The storage tank 40 is most desirably designed so as to have a low center of gravity in order to minimize undesired wind and/or wave influences, etc.

Figure 3:
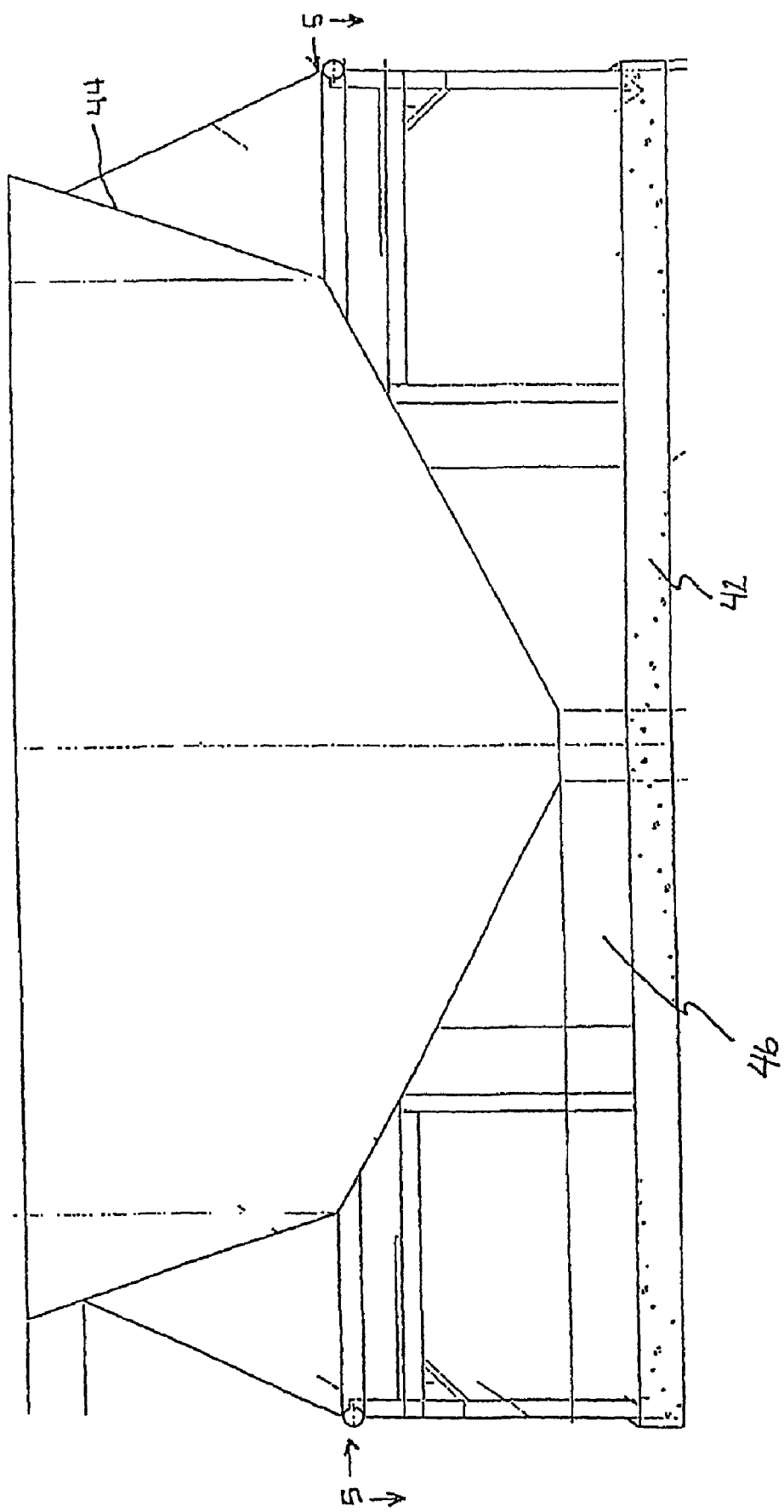
FIG. 3 is a side elevational view of the feed unit of one invention disclosed herein.
Figure 4:
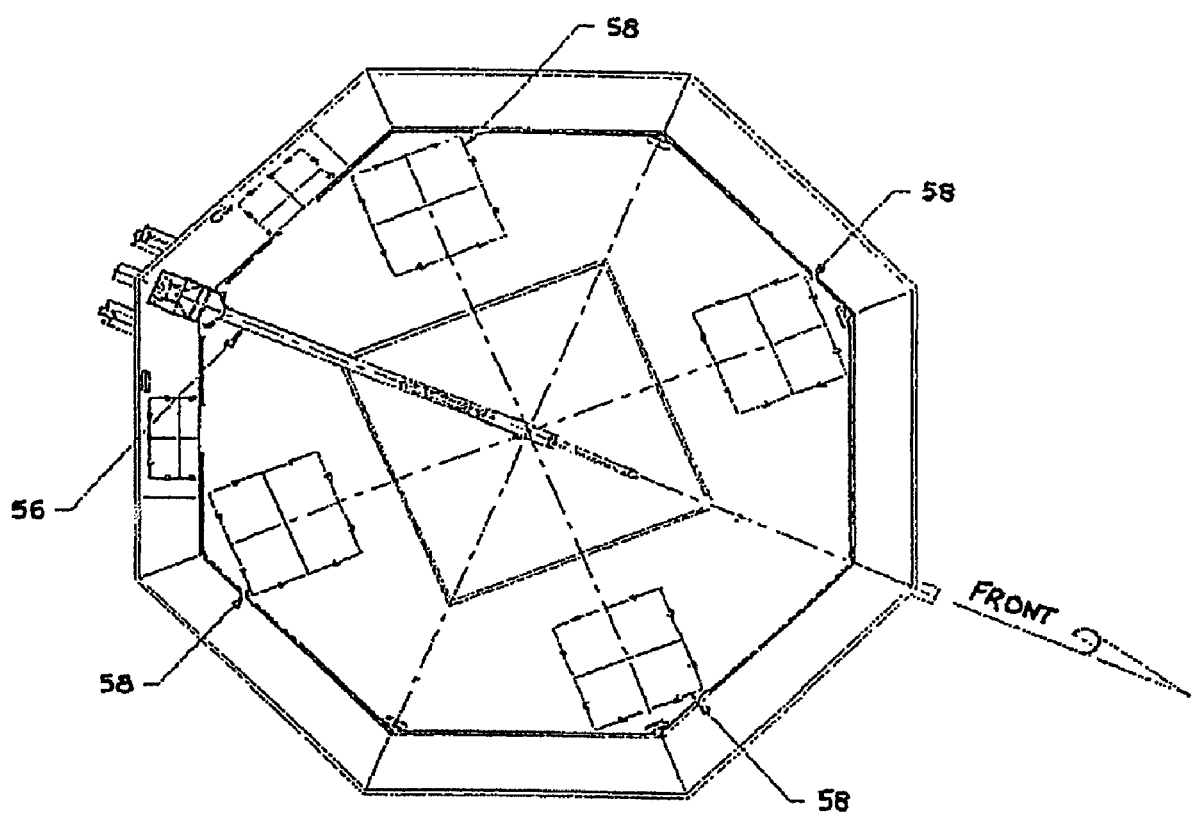
FIG. 4 is a top plan view of the unit of FIG. 3.
Figure 5:
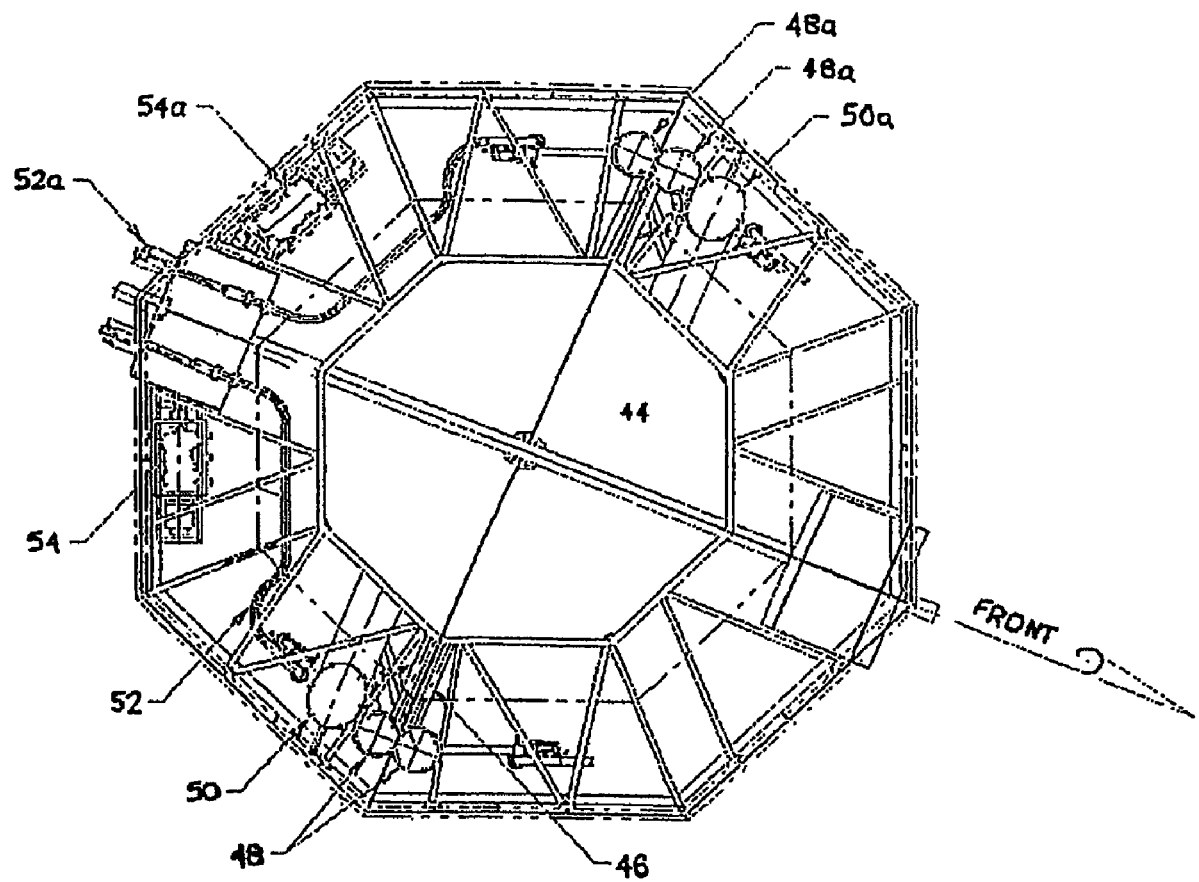
FIG. 5 is a horizontal section taken along the line 5-5 of FIG. 3.

As shown in FIGS. 3 to 5, storage tank 40 is mounted on a platform 42; the unit includes a downwardly and inwardly tapering bin 44 which is adapted to hold a supply of dry fish food (e.g. pellets). Depending on the size and number of fish cages, the bin 44 may be sized to provide several weeks or months supply of fish food.

The bin 44 includes suitable means (e.g. an auger or the like) indicated generally by reference numeral 46 adapted to feed fish food pellets to smaller mixing hoppers 48 (of which one or two can be included). Mixing chambers 48 are adapted to receive the dry pellets and to mix them into a slurry form with e.g. sea water. From the mixers 48, suitable conduit means are provided to connect the slurry feed to a pump 50 capable of forcing the slurry feed through a conduit 52 where it is distributed to the fish cages 10 and 12 (as will be described hereinafter in greater detail).

In the arrangement shown, a duplicate or identical back-up system is provided so that should one portion of the storage unit fail, duplicate mixing chambers 48a and pump 50a can be put into operation. It will be noted from FIG. 5 that in the arrangement illustrated, all of the necessary pumps, mixing chambers, etc., are located on the outer peripheral edge of the bin in order to provide a compact system.

The arrangement shown in FIGS. 3 to 5 most desirably includes independent power means in the form of engines 54 and 54a, driven by a suitable source of fuel (e.g. such engines can be gas or electrically driven). Such engines will provide power for the pumping system, mixing chambers, and any other requirements in order to maintain the feed tank in an automated condition.

Desirably, there is also provided means for filling the bin 44 from a supply vessel or barge or the like; as illustrated in FIG. 4 this may take the form of a crane referred to generally by reference numeral 56 suitably mounted to the feed unit; the crane desirably has a movable arm rotatable around a fixed pivot point and may be provided with a bucket or a hydraulic or a pneumatic system. The crane is positioned to be in operative relationship to the top of the bin 44, which is normally provided with one or more hatch covers 58 capable of being movably displaced so as to refill the bin when desired.

Referring now to FIG. 1 again, the feed storage unit 40 is fixedly secured to either or both of the deflector units 20 and the connecting means connecting the series of fish cages in alignment. To this end, a plurality of independently movable but pivotally attached cables 60 can be employed for this purpose. In this manner, the feed storage unit 40 will be retained in a fixed but independently movable relationship with the fish cages.

The feed storage unit may be provided with suitable buoyancy means in order to maintain a desired depth in the ocean; such buoyancy means can include structural materials designed to provide the desired buoyancy or air tanks/chambers.

Figure 6:
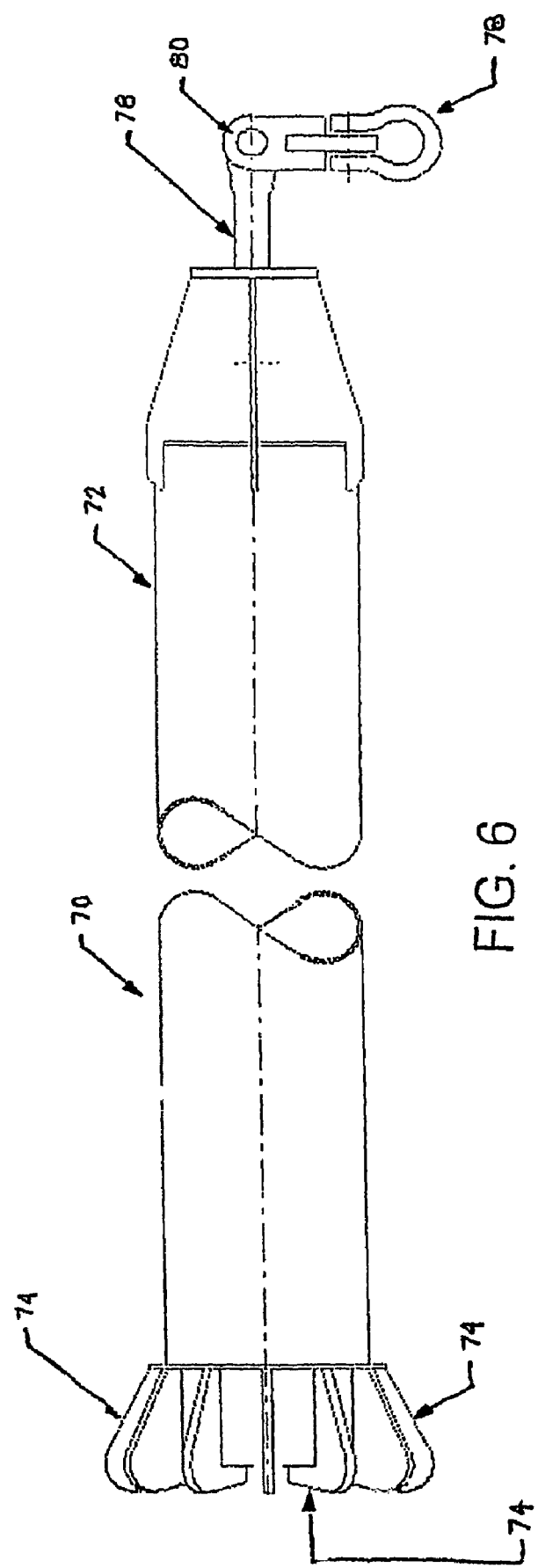
FIG. 6 is a side elevational view of a mooring unit according to another invention disclosed herein.
Figure 7:
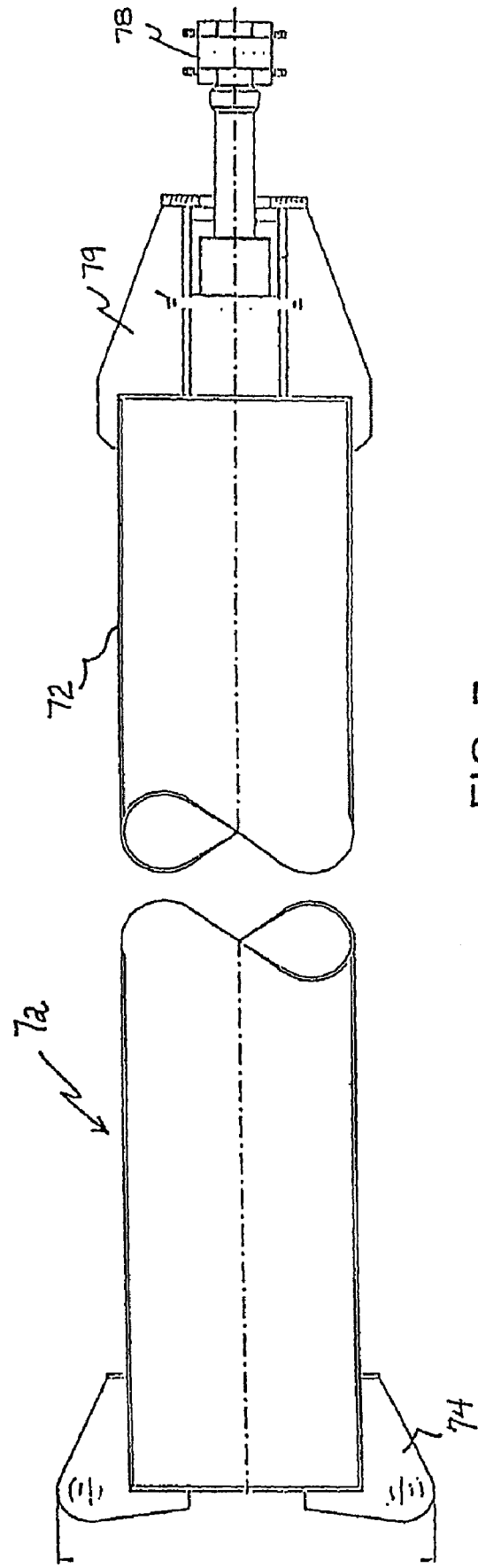
FIG. 7 is a view similar to FIG. 6 of a modified mooring unit.

Referring now to FIGS. 6 and 7 there is illustrated a further development used in connection with the anchoring system. More particularly, there is provided a novel mooring pole indicated generally by reference numeral 70, which consists of an elongated body 72 having at one end thereof a plurality of individual anchor cable fins 74 each of which is adapted to mount an anchor cable connected to an anchor (see FIG. 1). The fins 74 are in a fixed relationship one to the other and to the body 72 of the mooring pole.

At the opposed end, there is provided a rotatable shaft 76 mounted in the body 72; the rotatable shaft 76 includes a coupling 78 adapted to receive and fix thereto a primary cable (described hereinafter). The coupling 78 includes a pivot point 80 permitting the coupling to rotate/move as desired depending on current conditions. As will be seen from FIG. 1, the mooring unit is adapted to be positioned beneath the surface of the sea; the coupling 78 includes a primary floating cable 82 extending to either or both of the feed storage unit and the deflector 20.

FIG. 7 illustrates a modified version of the mooring pole where similar reference numerals describing similar parts are employed. In this case, the coupling 78a can be of a type which is adapted to receive and block a primary cable; as illustrated in FIG. 7, the coupling 78a may be mounted in a housing 79 fixedly secured to the body 72.

A plurality of anchors 84 are individually attached one each to the anchor fins via appropriate cables 86 with the anchors 84 being spread out generally in a circular arrangement. In this manner, the complete unit can be positioned in a desired location in the ocean.

Optionally, it may be preferable to include a weight means (not shown) at the bottom of the fish cages depending on their location to ensure that the cages maintain their desired configuration and, for example, do not collapse onto the fish or alternatively into other cages. Thus, the present invention contemplates the use of, for example, a weighted ring extending annularly along the bottom of the fish cage. Another example contemplated by the present invention includes a plurality of spaced apart weight means positioned along the bottom of each cage to restrain movement of the cages.

Referring now to FIGS. 8 to 11, there is also illustrated a preferred embodiment of the invention where each of the fish cages includes a fish feeding dispenser 100 capable of dispensing a slurry within a predetermined area for each of the fish cages. More particularly, a central housing 110 which is normally oriented in a vertical condition when in use. The housing 110 forms a hollow feeding chamber extending from an inlet indicated generally by reference numeral 112 and an outlet 116 at the top of the unit, described hereinafter in greater detail. The chamber can be of varying dimensions both lengthwise and widthwise depending on the area to be served by the unit; typically the diameter may range from 1 inch to 8-10 inches.

The inlet end, in the embodiment illustrated, includes a generally "U-shaped" lower end portion but the inlet may in fact be vertical or have other orientations depending on the nature of the aqueous body in which the body is to be located.

In the arrangement shown, the inlet includes a threaded or similar end portion 118 adapted to be coupled to a source of a slurry feed (not shown). In order to achieve the desired flow characteristics for the slurry feed, the inlet desirably has rounded corners 120a and 120b.

Figure 8:
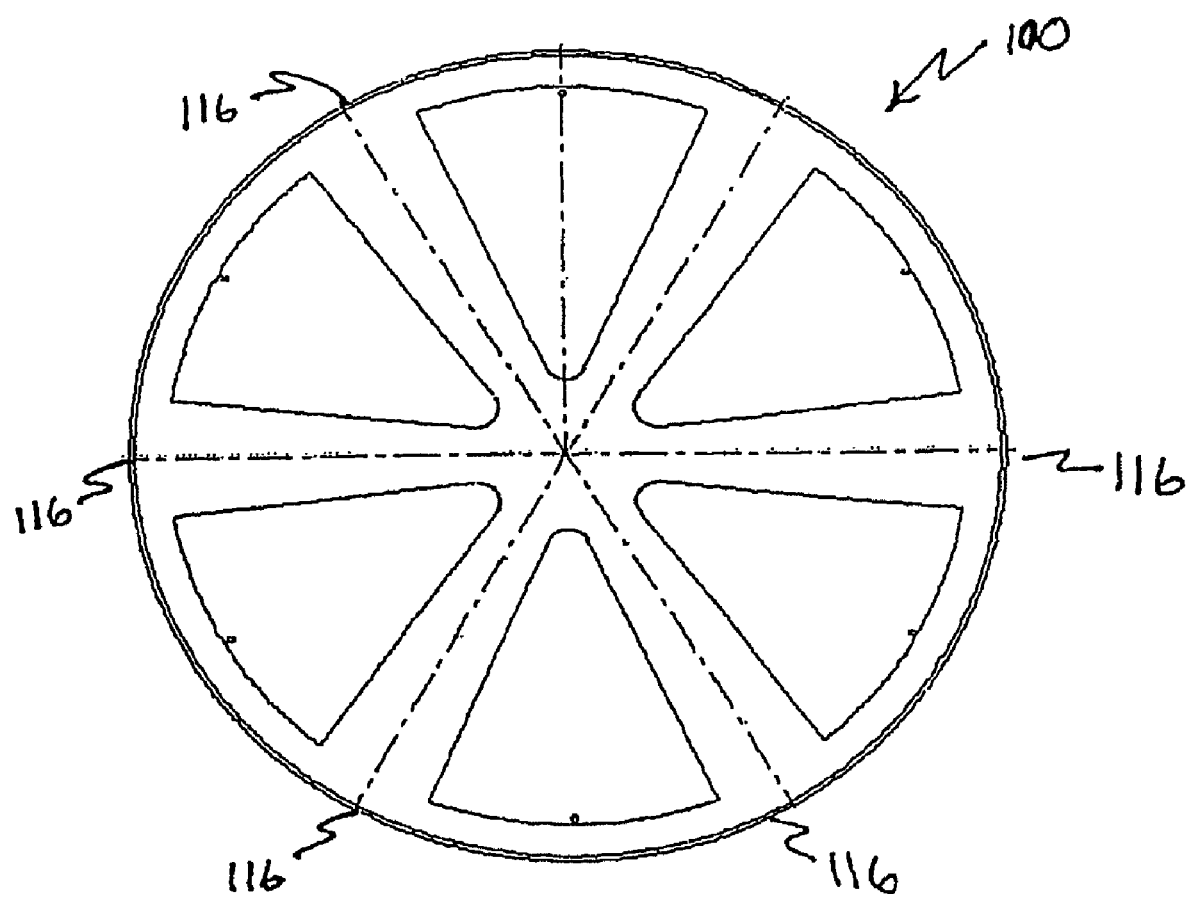
FIG. 8 is a top plan view of a feed dispersal system used in each of the fish cages.

FIG. 8 illustrates the feed dispenser 100 including a plurality (in this case 6 equally spaced apart) outlets emanating from a central portion, the outlets being indicated generally by reference numerals 116. Each outlet is designed to disperse a similar amount of slurry feed; the outlets are connected together at the top of the housing 100 through a generally "T-shaped" throat portion 122, which splits off into the desired number of outlets 116. Again, the throat section is preferably designed so as to provide smooth accurate contours in order to aid in the flow of the slurry in a desired manner. Each outlet can comprise an orifice which may be of a varying geometric configuration ranging from generally circular openings (in cross-section) to elongated openings; desirably the opening is dimensioned so as to permit the feed in the slurry to be readily dispersed without any danger of blocking the orifice, as well as to provide the necessary flow velocity. For an efficient operation, the outlets will be designed so that feed is spread in a non-overlapping pattern.

With respect to the number of discharge orifices, this will vary depending on the nature of the feed to be dispersed, the area of the aqueous body, and other factors which include desired flow velocities, etc. Distribution units of the present invention desirably have a balanced outlet configuration meaning that the outlets are arranged 25 in a spaced apart manner whereby the force exerted by the dispensing of the slurry feed from each of the nozzles is substantially neutral. Thus, for example, two or more outlets can be employed, each arranged in a diametrically opposed relationship; in the case of three outlets, preferably the geometric arrangement is such that the outlets are in a generally triangular configuration. The number of outlets can be as many as 12 or more for large slurry feeding distribution units or as few as two in the case of smaller aqueous bodies or fish types.

Figure 9:
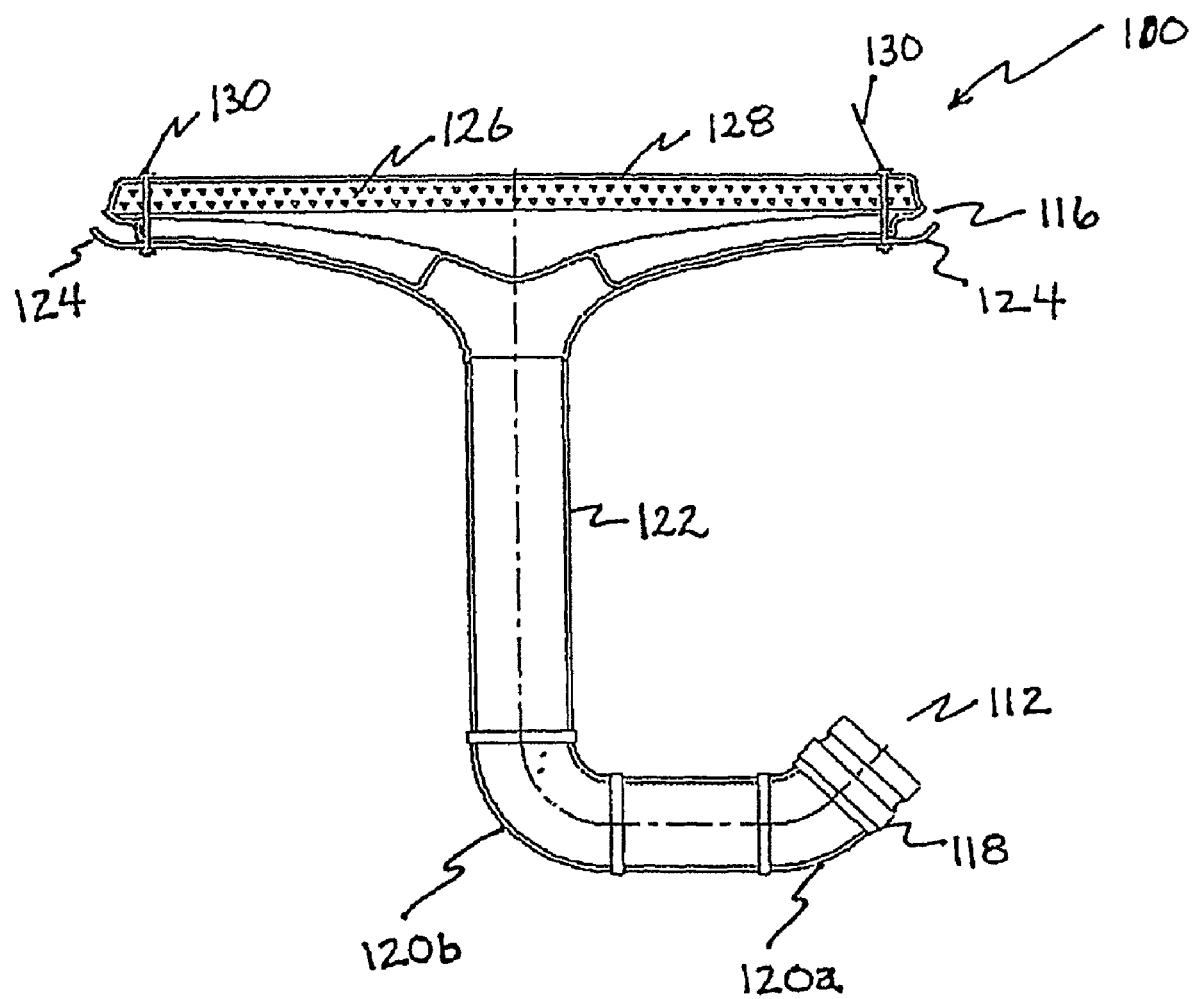
FIG. 9 is a side elevational view of the distribution system of FIG. 8

It will be seen from the drawings and FIG. 9 in particular that the orifices are most desirably oriented such that the slurry feed flow from the orifices is generally oriented upwardly. This is accomplished by the terminal ends of the orifices indicated by reference numeral 124 be acutely contoured; the angle between the horizontal plane on the lower side of the outlets or nozzles 116 and the vertical plane is such that the feed slurry is directed in an outwardly extending direction above the horizontal plane. Again, for different types of feeds or for different sizes of the distribution units of the present invention, the upwardly inclined discharge portion will have an angle of between 2° to 50°, desirably 3° to 25°, above the horizontal plane. This angle will also vary depending on the positioning of the unit within the aqueous body of water and the amount of water intended to lie above the discharge outlets. The body of water in which the units reside can be correlated to the angle of discharge from the nozzles 116 so as to effect a "welling up" of the aqueous liquid outwardly from the nozzles but without the nozzles being at an angle which would cause the feed slurry to break through the water level.

Optionally, the unit may include buoyancy means indicated generally by reference numeral 126; this buoyancy unit can be designed to maintain the distribution unit at a desired level in an aqueous body. The buoyancy means may be any suitable component such as foam, air bladders, etc. The distribution unit or dispenser 100 may also include cover means 128 if desired such as a rigid cover of suitable material. If a cover is included, it preferably substantially covers all of the diameter of the unit, but not necessarily the apertures or outlets. The cover may be anchored to the feed conduits or outlets 116 by appropriate means such as by screws 130 or the like.

Figure 10:
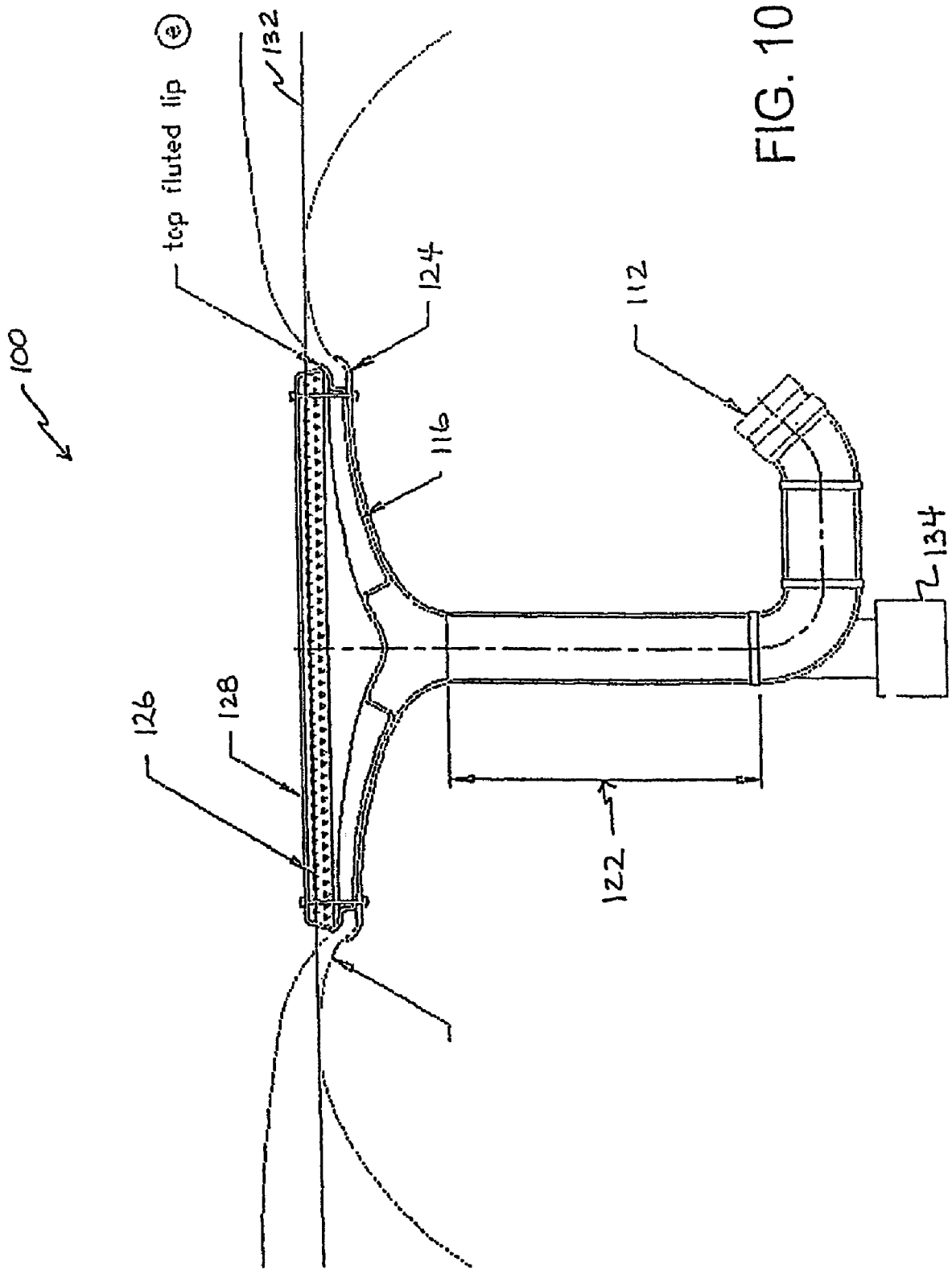
FIG. 10 is a view similar to that of FIG. 9 showing the feed slurry distribution pattern in a body of water when the system of FIG. 8 is in use.

If desired, the central housing 100 of the unit may be provided with a protective screen or border (not shown) to prevent contact of the housing body by fish. Referring to FIG. 10, there is illustrated the distribution unit placed in a body of water, the surface of which is indicated by reference numeral 132. One optional feature illustrated in FIG. 10 includes a provision of weight means 134 to position the distribution unit in a desired location in a body of aqueous liquid. The weight means 134 can take various forms—indeed, the unit may be anchored to the bottom using conventional weights such as cement blocks or in deeper water, the unit may be generally anchored in place by means of bottom anchors extending to the bottom of the sea.

Figure 11:
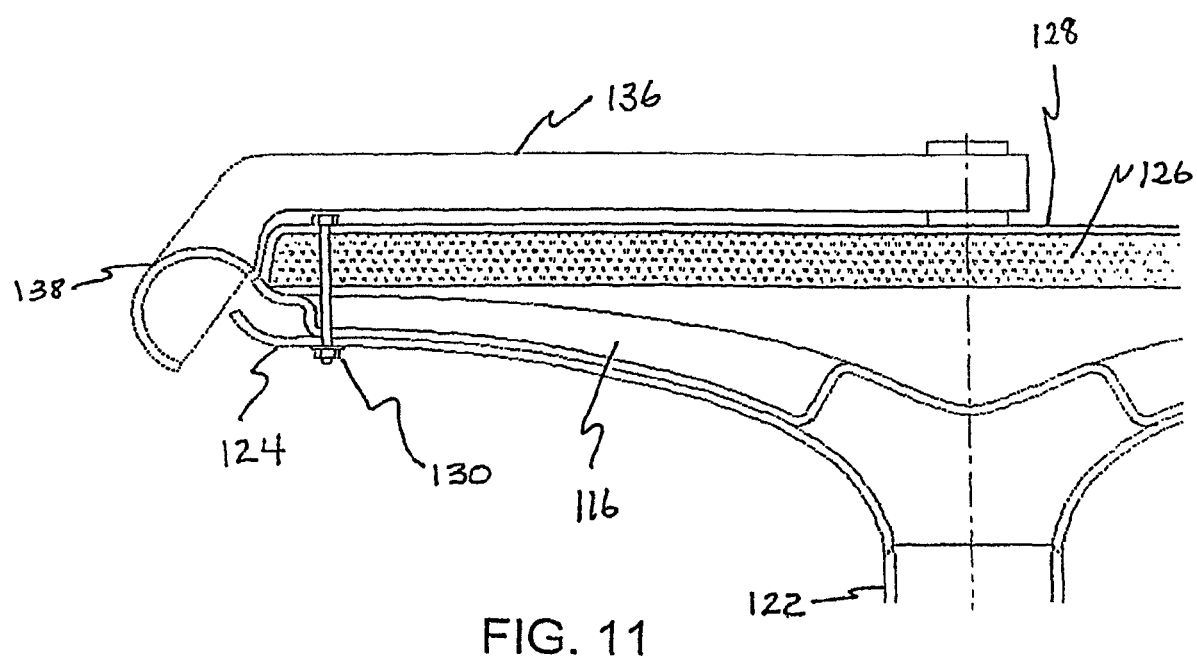
FIG. 11 is an enlarged partial vertical section view showing a preferred structure for the feed distribution system.

Another optional feature of the distributor is illustrated in FIG. 11; if desired, the unit can be designed to move about a body of water by providing directional control means operating in conjunction with one of the discharge outlets for the slurry feed. In particular, a "U-shaped" channel or body 136 is mounted to the top surface 128 of the apparatus and the channel 136 is provided with a terminal end portion 138 angularly disposed with respect to its main body. The disposition of the terminal end portion is such that it is designed to receive and displace the flow of slurry in a downwardly and rearwardly extending orientation from one of the slurry channels. In this way, the unit may move about the surface of a body of liquid so as to permit a greater area to be fed using a single apparatus. The degree of movement can be controlled by the length of any tethering device attached to the diffuser and the degree of movement permitted by the tethering device.

In another optional embodiment of the present invention, the distributor may include remote control means operatively mounted in or on the unit to permit the unit to be displaced/moved to different locations. In such a case, the unit need not be provided with anchoring or tethering means; such remote control means are well known for different purposes and can be pre-programmed to cover pre-defined and predetermined patterns. Thus, a suitable motor can be provided, connected to a drive means for propelling the unit.

For use in climates where ice conditions may be of a concern, the unit can be provided with suitable anti-icing features such as electrical heaters built into the apparatus which are adapted to be turned on when icing conditions are encountered. The distributor can be provided with battery means which can be actuated remotely to effect de-icing when such conditions are encountered. To that end, remote telemetry can also be employed to indicate to a central control (such as a CPU) that icing conditions have been encountered and either the de-icing is remotely activated by manual or automated means.

The distributor of the present invention can be made from various types of materials. Depending on the environment in which the apparatus is intended to be located, suitable materials include metals of various types, plastics, etc.

The unitary fish farming system of the present invention is further capable of being moved from its off-shore position to safe harbour simply by towing the system as a unit in the event of serious inclement weather or imminent threat to the site which may otherwise damage the fish in the containers.

As described in detail herein above, the off-shore unitary fish farming system of the present invention, provides an efficient and economical way of farming large quantities of fish at an off-shore site.

What is claimed is:

1. A storage unit comprising:
   a self-contained centralized fish-feed storage and distribution tank suitable for use in open water, said fish feed storage and distribution tank including:
   a feed storage bin adapted to hold a supply of fish food;
   a metering means for metering a supply of fish feed from said feed storage bin to a mixing chamber;
   a mixing chamber for receiving fish feed metered by said metering means, said mixing chamber being connected to a source of water wherein a feed slurry is formed in said mixing chamber;
   a pump means operatively associated with said mixing chamber to force the slurry of fish food from said mixing chamber with pressurized water to a slurry feed dispensing device for dispensing said slurry feed, said device being suitable for feeding fish beneath the surface of a water body, and
   a floatable housing having an upper portion including dispensing means for dispensing fish feed and a lower portion including an inlet for receiving the fish feed from said pump means, and an outlet in fluid communication with said dispensing means; said dispensing means having a throat portion, and having at least one channel for dispensing the fish feed which is connected to said outlet.

2. The storage unit of claim 1, wherein said mixing chamber is located exteriorly and peripherally of said feed storage bin.

3. The storage unit of claim 1, wherein said pump means is located exteriorly and peripherally of said feed storage bin.

4. The storage unit of claim 1, further comprising independent power means for providing operating power for said mixing chamber and said pump means.

5. The storage unit of claim 1, further comprising means for filling said feed storage bin with feed from a source supply thereof.

6. The storage unit of claim 5, wherein said means for filling said feed storage bin includes a crane operatively associated with said mounting means.

7. The storage unit of claim 1, further comprising a plurality of feed storage bins and one or more displaceable hatch covers associated with each of said feed storage bins to permit refilling of fish food.

8. The storage unit of claim 1, further comprising buoyancy means.

9. The storage unit of claim 1, further comprising means for forcing a slurry of feed from said mixing chamber through a conduit with pressurized water to said inlet of said housing.

10. The storage unit of claim 1, wherein said feed slurry is dispensed by said dispensing means beneath the surface of an aqueous body.

11. A containment system for feeding fish in an environmentally exposed aquatic site comprising the storage unit of claim 1.

12. The storage unit of claim 6, wherein the dispensing of feed is automated.

13. The storage unit of claim 1, wherein said mixing chamber is located exteriorly and peripherally of said feed storage bin.

14. The storage unit of claim 1, wherein said pump means is located exteriorly and peripherally of said feed storage bin.

15. The storage unit of claim 1, wherein said storage unit includes means for filling said feed storage bin with feed from a source supply thereof.

* * * * *